United States Patent

Godsey

[11] Patent Number: 5,912,285
[45] Date of Patent: Jun. 15, 1999

[54] DOG BONES USING VEGETABLE FLAVORING

[76] Inventor: Samuel W. Godsey, 1001 Evergreen Ct., Plymouth, Wis. 53073

[21] Appl. No.: 09/010,243

[22] Filed: Jan. 21, 1998

[51] Int. Cl.⁶ .......................... C08L 89/00; A01K 29/00
[52] U.S. Cl. .......................... 524/17; 119/707; 119/708; 119/709; 119/710; 119/711
[58] Field of Search ............... 524/17; 119/707, 119/708, 709, 710, 711

[56] References Cited

U.S. PATENT DOCUMENTS

| | | | |
|---|---|---|---|
| 3,871,334 | 3/1975 | Axelrod | 119/29.5 |
| 4,513,014 | 4/1985 | Edwards | 426/132 |
| 4,546,001 | 10/1985 | Gellman et al. | 426/549 |
| 4,557,219 | 12/1985 | Edwards | 119/29.5 |
| 4,674,444 | 6/1987 | Axelrod | 119/29.5 |
| 4,681,758 | 7/1987 | Fruthaler et al. | 524/17 |
| 4,771,733 | 9/1988 | Axelrod | 119/29.5 |
| 4,919,083 | 4/1990 | Axelrod | 119/29 |
| 4,924,811 | 5/1990 | Axelrod | 119/29 |
| 5,263,436 | 11/1993 | Axelrod | 119/710 |
| 5,339,771 | 8/1994 | Axelrod | 119/710 |

FOREIGN PATENT DOCUMENTS 2083217  10/1971  France ..................... A01K 15/00

OTHER PUBLICATIONS

Copy of packaging label "Booda Velvets", Booda Products, Inc., Gardenia, California, copyright 1994.

Wixon Company, product description for Vegamine 83D, dated at least as early as Oct., 1997.

*Primary Examiner*—Peter A. Szekely
*Attorney, Agent, or Firm*—Michael Best & Friedrich LLP

[57] ABSTRACT

A chew toy includes a vegetable-based flavor and scent additive which is not surface migrating in thermoplastic materials. The chew toy is made by a process in which powdered vegetable-based flavor and scent additive is first mixed with thermoplastic pellets in a rotating drum, and then the mixture is heated to the melting point of the thermoplastic material and injection molded. A coloring additive may be added to the mixture of thermoplastic pellets and vegetable-based additive prior to melting the thermoplastic material.

8 Claims, 1 Drawing Sheet

DOG BONES USING VEGETABLE FLAVORING

FIELD OF THE INVENTION

The invention relates to chew toys for animals, and more particularly to thermoplastic chew toys incorporating artificial scent or flavor.

BACKGROUND OF THE INVENTION

A chew toy, such as a dog bone, is commonly made of a thermoplastic material, such as polyethylene, polyurethane, or nylon. Some prior art thermoplastic chew toys are flavored or scented to make the chew toy more attractive to a domestic animal, such as a dog. Such prior art flavored or scented chew toys are made by the processes of: aqueous impregnation with animal by-product; mixing the thermoplastic material with a starch-based flavoring; mixing the thermoplastic material with an oil-based flavoring extract; or mixing the thermoplastic material with animal meal.

Aqueous impregnation with animal by-product typically involves the separate steps of first injection molding the chew toy, and then boiling the chew toy in a broth containing animal parts or animal by-product. Boiling time varies with the thermoplastic material used. For example, the chew toy is boiled for up to 2 hours if the toy is made of polyurethane, and up to 20 hours if the toy is made of nylon.

Aqueous impregnation with animal by-product requires the extra step of boiling the chew toy, which adds time and expense to the manufacturing process. The large boiling tank or pressure cooker required for aqueous impregnation with animal by-product can be an expensive piece of equipment. The tank occupies space in a factory that could be used for other purposes. The cost of energy needed for boiling or pressure cooking raises production costs. Depending on the thermoplastic material used to make the chew toy, the boiling process can take up to 20 hours, which will slow down production. Last, aqueous impregnation using animal by-product results in only small penetrations into the chew toy, on the order of three microns. This small amount of penetration causes the toy to lose its flavor or scent once the surface layer of the toy has been chewed up.

Another prior art chew toy has been made which combines a large amount of corn starch with polyethylene. Polyethylene is a less durable thermoplastic material than polyurethane or nylon, and can be chewed into pieces and splinters by the animal. The animal may swallow the pieces and splinters of polyethylene, which can cause the animal to choke. Polyethylene is not digestible by animals, and can cause complications in an animal's digestive system if it is swallowed. Another problem with this type of chew toy is that it contains a high percentage of starch, which causes the chew toy to grow mold and to have a relatively short shelf life. Additionally, the high percentage of starch makes the chew toy biodegradable, which may cause the toy to disintegrate when moistened (e.g., when chewed).

Flavoring or scenting a chew toy with an oil-based flavor or scent additive typically involves mixing the oil-based additive to a solidified or melted thermoplastic material and injection molding the mixture to form a chew toy. The oil-based additive is typically carried by thermoplastic pellets, which are mixed in with the solid or melted thermoplastic material. The oil extract is typically not compatible with thermoplastic materials, and the resulting chew toy therefore has a surface migrating flavor or scent as the oil extract is constantly urged to the surface of the chew toy.

Surface migration resulting from the use of oil-based additives may cause the flavor or scent to be used up quickly as the animal chews through the surface layer of the toy. Uniform dispersion of flavor or scent throughout the useful life of the toy is made impossible due to the surface migrating characteristic of the oil extract in thermoplastic materials. Another disadvantage is that the oil extract carried by thermoplastic pellets is relatively expensive, which is usually reflected in the increased cost of the chew toy.

Forming a thermoplastic chew toy with animal meal typically involves sifting ground animal meat and by-product to remove pieces that are larger than a selected maximum size, then mixing the meal with thermoplastic beads, melting the beads, and then injection molding the mixture into a selected chew toy shape.

The problem with using animal meal in the chew toy is that grinding and sifting the meal can be a time consuming and difficult task. Meat and animal by-product may be relatively expensive. Also, the particles have to be small enough to be suspended in the toy, therefore, some meat may have to be ground and reground and sifted. Those pieces that cannot be acceptably reduced in size are discarded as waste. Using meat and animal by-products adds saturated fat and cholesterol to the chew toy, which may be detrimental to the animal's health and undesirable to pet owners.

The above methods for adding flavor or scent to a chew toy have inadequacies in cost, time, flavor and scent dispersion, and health effects.

SUMMARY OF THE INVENTION

The invention provides a thermoplastic chew toy which is flavored or scented by a vegetable-based, non-surface migrating additive. The thermoplastic chew toy of the present invention is made by a cost and time efficient process which results in a chew toy having uniformly dispersed flavor or scent characteristics. Different flavors and scents are created by selecting the amino acids present in the vegetable proteins of the vegetable-based additive such that the selected amino acids have the desired scent or flavor.

In one embodiment, the chew toy of the present invention is made by a process which includes the first step of providing a powdered vegetable-based additive having amino acids that provide a selected scent or flavor such as beef, ham, or chicken, and then mixing the powdered vegetable-based additive with thermoplastic pellets, such as pellets of polyurethane, in a drum tumbler. Once the vegetable-based additive is uniformly dispersed among the pellets, the mixture is loaded into the drier of an injection molding machine with a vacuum elevator. The mixture is dried in the drier, and then allowed to pass into a mixer. In the mixer, a liquid coloring additive is added to the mixture, and the mixture is stirred until a substantially uniform dispersion of the coloring additive in the mixture is attained. The mixture of thermoplastic pellets, powdered additive, and liquid coloring then passes to the barrel heater of the injection molding machine, where the mixture melts, thereby creating a flowable mixture. Then the flowable mixture is further mixed with an auger in the barrel heater, and is injection molded under pressure to form a dog bone or other chew toy.

The chew toy can be made by an alternative process in which both the vegetable-based additive and the coloring additive are added to the thermoplastic material after the thermoplastic material is melted. In this process, the additives may be pre-mixed together before mixing the pre-mixture with the melted thermoplastic material, or the additives may be added to the melted thermoplastic material without pre-mixing. The additives are stirred into the thermoplastic material to achieve a uniform dispersion of color and flavor or scent in the thermoplastic material. Once a uniform dispersion is achieved, the colored and flavored or scented thermoplastic material is injection molded to form the chew toy. In any case, the chew toy is then cooled at room temperature.

It is a feature and advantage of the present invention to provide a chew toy that incorporates a vegetable-based flavor or scent additive which is not surface migratory and which is initially uniformly distributed throughout the chew toy and remains uniformly dispersed throughout the useful life of the chew toy.

It is a feature and advantage of the present invention to provide a chew toy that is made by a time and cost efficient process.

These and other features and advantages of the present invention will be apparent to those skilled in the art with the following detailed description of the preferred embodiments and the drawings.

DESCRIPTION OF THE PREFERRED EMBODIMENT

Figure 1:
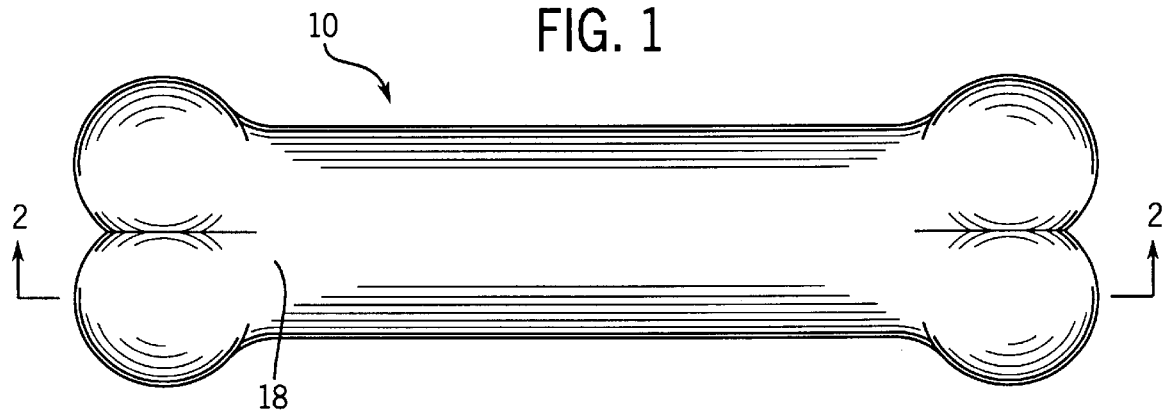
FIG. 1 is a top view of a chew toy according to the present invention.

FIG. 1 shows a chew toy 10 made according to the present invention. The chew toy 10 may be formed in the shape of, for example, a dog bone, a tug toy, or a pull ring, but can be injection molded in virtually any shape. In the preferred embodiment, the chew toy 10 is in the shape of a dog bone as seen in FIG. 1. The chew toy 10 is intended to be used by a dog or any other domestic animal.

Figure 2:
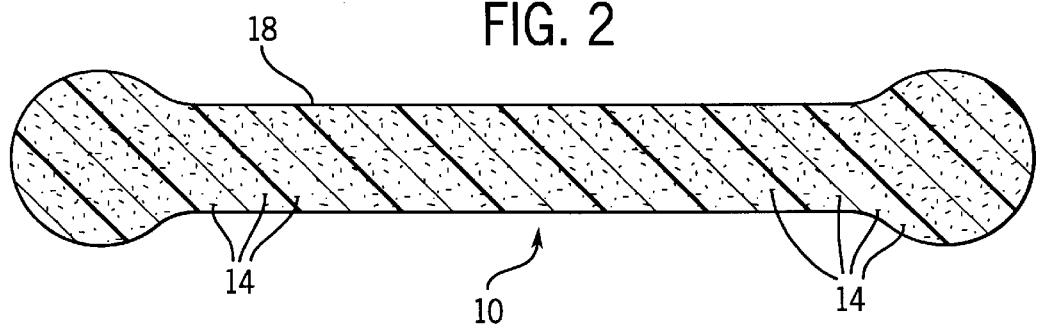
FIG. 2 is a sectional view of the chew toy of FIG. 1, taken along line 2—2.

As seen in FIG. 2, the chew toy 10 includes a substantially uniform dispersion of a flavor or scent additive 14. In the preferred embodiment, the flavor or scent additive 14 is a vegetable-based additive that is commercially available from the Wixon Company, of St. Francis, Wis., and is sold under the name VEGEMINE 83D. The vegetable-based additive 14 is sold in powder form, and contains hydrolyzed corn protein with a maximum of 2% partially hydrogenated soybean oil. The flavor or scent is controlled by the presence of certain amino acids in the corn protein. The chemical properties of VEGEMINE 83D are listed below:

| Ash | 54.0% ± 2.0 |
| --- | --- |
| Organic Solids | 44.0% ± 3.0 |
| Sodium Chloride | 44.0% ± 2.0 |
| Protein (N × 6.25) | 31.0% ± 3.0 |
| pH (3% solution) | 5.2 ± 0.3 |
| Moisture | 4.0% maximum |
| Granulation (U.S.) Thru #40 | 95% minimum |

The chew toy 10 is made of a thermoplastic material 18, such as nylon or polyurethane. In the preferred embodiment, the chew toy 10 is made of polyurethane.

According to the preferred embodiment, the chew toy 10 is made by first mixing pellets of thermoplastic material 18 with the vegetable-based additive 14 in a drum tumbler. Thermoplastic pellets are slightly tacky at room temperature, which causes the powdered vegetable-based additive 14 to stick to the pellets. I have found that it takes about 15 minutes of tumbling to achieve uniform dispersion of the vegetable-based additive 14 among the pellets, although longer or shorter times may be used.

Once the vegetable-based additive 14 is uniformly dispersed among the thermoplastic pellets, the mixture of pellets and vegetable-based additive is transferred to a drier of an injection molding machine. The mixture is loaded into the drier with a vacuum elevator. In the drier, the mixture is dried to remove moisture from the thermoplastic material.

From the drier, the mixture is funneled into a mixer positioned below the drier. In the mixer, liquid coloring additive may be added to the mixture of thermoplastic pellets and vegetable-based additive by shooting or squirting the liquid coloring additive into the mixer while agitating the mixture to uniformly disperse the coloring additive among the thermoplastic pellets and vegetable-based additive. If the liquid coloring additive is added, the mixture now consists of thermoplastic material, vegetable-based additive, and coloring additive. The coloring additive is not necessary, however.

The mixture is then moved to a barrel heater attached to the injection molding machine, and heated to a temperature of between about 300° F. and about 375° F., causing the thermoplastic material 18 to melt. Located within the barrel heater is an auger or screw-type mixer, which acts on the thermoplastic material as the material melts. The auger further mixes the melted thermoplastic material with the vegetable-based additive and coloring additive, if the coloring additive has been added. A flowable mixture is thereby created consisting of melted thermoplastic material 18, vegetable-based additive 14, and coloring additive, if the coloring additive is added.

The auger also acts to urge the flowable mixture toward a pressure chamber at the base of the barrel heater. A selected amount of flowable material is allowed into the pressure chamber, and the flowable mixture in the pressure chamber is injection molded into the desired shape for the chew toy 10.

The chew toy 10 may also be made by an alternative process in which the thermoplastic material 18 is first melted, and then the coloring additive and the vegetable-based additive 14 are mixed into the melted thermoplastic material 18 to obtain a flowable mixture having uniform dispersion of the additives. In the mixing step, the coloring additive and the vegetable-based additive 14 can be added separately to the melted thermoplastic material, or the powdered vegetable-based additive 14 can be first mixed into the liquid coloring additive, thereby creating a pre-mixture which is added to the melted thermoplastic material. Once a uniform dispersion of coloring additive and vegetable-based additive 14 has been achieved, the polyurethane is injection molded as described above. Regardless of which process is used to manufacture the chew toy, the flavored or scented toy is then dried at room temperature for about 5 minutes.

The coloring additive can be used to identify the flavor or scent of the chew toy. For example, all chicken flavored or scented chew toys can be colored yellow while beef chew toys are colored red. The coloring additives used to make the chew toy of the present invention are commercially available from many sources, including Ferro of Plymouth, Ind. sold under the trade names 73-1325-1 RED SPECTRA FLO, 73-1324-1 BROWN SPECTRA FLO, and 79-1200-1 TAN SPECTRA FLO. The preferred colors are brown, red, and tan.

Although particular embodiments of the present invention have been shown and described, other alternate embodiments will be apparent to those skilled in the art and are within the intended scope of the present invention. Thus, the present invention is to be limited only by the following claims.

I claim:

1. An animal chew toy comprising, in combination:
    a thermoplastic material selected from the group consisting of polyurethane and nylon; and
    a vegetable-based additive including a corn protein and having at least one amino acid which imparts a scent, the vegetable-based additive being substantially uniformly dispersed in the thermoplastic material.

2. The chew toy of claim 1, wherein the vegetable-based additive constitutes 2–5% of the toy by weight.

3. The chew toy of claim 1, wherein the vegetable-based additive further includes a maximum of about 2% soybean oil.

4. The chew toy of claim 1, wherein the vegetable-based additive is supplied in powder form, at least 95% of which powder passes through #40 mesh.

5. The chew toy of claim 1, wherein the vegetable-based additive has a pH of about 5.2, and wherein the chew toy further includes: about 54% ash of which 81.5% is NaCl, about 44% organic solids, and a maximum of up to 4% moisture.

6. The chew toy of claim 1, wherein the vegetable-based additive remains substantially uniformly dispersed in the thermoplastic material after the chew toy has been molded.

7. The chew toy of claim 1, further comprising a coloring additive.

8. The chew toy of claim 7, wherein the coloring additive imparts a color to the chew toy that is selected from the group consisting of brown, red, and tan.

* * * * *